United States Patent
Biamonte et al.

(10) Patent No.: US 9,984,333 B2
(45) Date of Patent: May 29, 2018

(54) PHYSICAL REALIZATIONS OF A UNIVERSAL ADIABATIC QUANTUM COMPUTER

(71) Applicant: D-Wave Systems Inc., Burnaby (CA)

(72) Inventors: Jacob Daniel Biamonte, Burnaby (CA); Andrew J. Berkley, Vancouver (CA); Mohammad H.S. Amin, Burnaby (CA)

(73) Assignee: D-Wave Systems Inc., Burnaby (CA)

( * ) Notice: Subject to any disclaimer, the term of this patent is extended or adjusted under 35 U.S.C. 154(b) by 235 days.

(21) Appl. No.: 14/860,087

(22) Filed: Sep. 21, 2015

(65) Prior Publication Data

US 2016/0012346 A1 Jan. 14, 2016

Related U.S. Application Data

(60) Continuation of application No. 13/539,039, filed on Jun. 29, 2012, now Pat. No. 9,162,881, which is a division of application No. 12/098,348, filed on Apr. 4, 2008, now Pat. No. 8,234,103.

(60) Provisional application No. 60/910,445, filed on Apr. 5, 2007.

(51) Int. Cl.
*G06N 99/00* (2010.01)
*B82Y 10/00* (2011.01)

(52) U.S. Cl.
CPC ............ *G06N 99/002* (2013.01); *B82Y 10/00* (2013.01); *G06N 99/00* (2013.01); *Y10S 977/933* (2013.01)

(58) Field of Classification Search
None
See application file for complete search history.

(56) References Cited

U.S. PATENT DOCUMENTS

| | | |
|---|---|---|
| 6,605,822 B1 | 8/2003 | Blais et al. |
| 6,753,546 B2 | 6/2004 | Tzalenchuk et al. |
| 6,838,694 B2 | 1/2005 | Esteve et al. |
| 7,002,174 B2 | 2/2006 | Il'ichev et al. |
| 7,135,701 B2 | 11/2006 | Amin et al. |
| 7,253,654 B2 | 8/2007 | Amin |
| 7,335,909 B2 | 2/2008 | Amin et al. |
| 8,234,103 B2 | 7/2012 | Biamonte et al. |
| 9,162,881 B2 | 10/2015 | Biamonte et al. |
| 2005/0001209 A1 | 1/2005 | Hilton et al. |

(Continued)

FOREIGN PATENT DOCUMENTS

| | | |
|---|---|---|
| WO | 2004/102470 A2 | 11/2004 |
| WO | 2005/093649 A1 | 10/2005 |
| WO | 2006/024939 A2 | 3/2006 |

OTHER PUBLICATIONS

Wendin, et al., Superconducting Quantum Circuits, Qubits and Computing, Handbook of Theoretical and Computational Nanoscience 1, Ch.129, 2005, pp. 1-60.*

(Continued)

*Primary Examiner* — Wilbert L Starks
(74) *Attorney, Agent, or Firm* — Seed IP Law Group LLP

(57) ABSTRACT

Devices, methods and articles advantageously allow communications between qubits to provide an architecture for universal adiabatic quantum computation. The architecture includes a first coupled basis $A_1B_1$ and a second coupled basis $A_2B_2$ that does not commute with the first basis $A_1B_1$.

6 Claims, 10 Drawing Sheets

(56) References Cited

U.S. PATENT DOCUMENTS

| | | |
|---|---|---|
| 2005/0256007 A1 | 11/2005 | Amin et al. |
| 2006/0097747 A1 | 5/2006 | Amin |
| 2006/0147154 A1 | 7/2006 | Thom et al. |
| 2006/0225165 A1 | 10/2006 | Maassen van den Brink et al. |
| 2008/0238531 A1 | 10/2008 | Harris |
| 2009/0078932 A1 | 3/2009 | Amin |

OTHER PUBLICATIONS

Harris, et al., Probing Noise in Flux Qubits via Macroscopic Resonant Tunneling, arXiv, 2008, pp. 1-4.*
European Search Report, dated Nov. 18, 2010, for EP 08733736.6, 12 pages.
Angelakis et al., "Many body effects and cluster state quantum computation in strongly interacting systems of photons," Invited paper in the Quantum Information and Many Body Quantum Systems referred proceedings. Published in the "Publications of Scuola Normale Superiore," CRM Series, vol. 5., ISBN: 978-88-7642-30, 2008, pp. 1-10.
Averin et al., "Variable Electrostatic Transformer: Controllable Coupling of Two Charge Qubits," *Physical Review Letters* 91(5): 057003-1—057003-4, Aug. 1, 2003.
Bartlett et al., "Simple Nearest-Neighbor Two-Body Hamiltonian System for Which the Ground State is a Universal Resource for Quantum Computation," Physical Review A 74:040302-1—040302-4, 2006.
Berkley et al., "Systems, Methods and Apparatus for Local Programming of Quantum Processor Elecments," U.S. Appl. No. 11/950,276, filed Dec. 4, 2007, 31 pages.
Biamonte et al., "Physical Implementations for a Universal Quantum Computer and Related Coupling Devices," U.S. Appl. No. 60/910,445, filed Apr. 5, 2007, 63 pages.
Biamonte et al., "Physical Realizations of a Universal Adiabatic Quantum Computer," Office Action dated Mar. 16, 2012, for U.S. Appl. No. 12/098,348, 6 pages.
Biamonte et al., "Physical Realizations of a Universal Adiabatic Quantum Computer," Notice of Allowance dated Mar. 28, 2012, for U.S. Appl. No. 12/098,348, 8 pages.
Biamonte et al., "Physical Realizations of a Universal Adiabatic Quantum Computer," Notice of Allowance dated Jun. 18, 2015, for U.S. Appl. No. 13/539,039, 9 pages.
Biamonte et al., "Realizable Hamiltonians for Universal Adiabatic Quantum Computers," arXiv:0704.1287v1 [quant-ph], pp. 1-4, Apr. 10, 2007.
Biamonte et al., "Realizable Hamiltonians for Universal Adiabatic Quantum Computers," *Physical Review A* 78:012352, 2008, pp. 012352-1 through 012352-7.
Blatter et al., "Design aspects of superconducting-phase quantum bits," *Physical Review B* 63: 174511-1—174511-9, 2001.
Bravyi et al., "The Complexity of Stoquastic Local Hamiltonian Problems," arXiv:quant-ph/0606140v1, pp. 1-21, Jun. 16, 2006.
Choi, "Systems, Devices, and Methods for Analog Processing," U.S. Appl. No. 60/986,554, filed Nov. 8, 2007, 39 pages.
Corato et al., "Adiabatic Quantum Computation with Flux Qbits," Quantum Computing in Solid State Systems, pp. 103-110, 2006.
Farhi et al., "Quantum Adiabatic Evolution Algorithms versus Simulated Annealing," MIT-CTP #3228, arXiv:quant-ph/0201031 vl, pp. 1-16, Jan. 8, 2002.
Feynman, "Simulating Physics with Computers," *International Journal of Theoretical Physics* 21(6/7): 467-488, 1982.
Friedman et al., "Quantum superposition of distinct macroscopic states," *Nature* 406: 43-46, Jul. 6, 2000.
Harris, "Systems, Devices, and Methods for Controllably Coupling Qubits," U.S. Appl. No. 12/017,995, filed Jan. 22, 2008, 33 pages.
Harris, "Systems, Methods and Apparatus for Anti-Symmetric Qubit-Coupling," U.S. Appl. No. 12/098,347, filed Apr. 4, 2008, 33 pages.

Harris et al., "Sign and Magnitude Tunable Coupler for Superconducting Flux Qubits," arXiv:cond-mat/0608253 vl, Aug. 11, 2006.
He et al., "Switchable Coupling Between Charge and Flux Qubits," arXiv:cond-mat/0703012v2 [cond-mat. supr-con], 5 pages, 2007.
Hime et al., "Solid-State Qubits with Current-Controlled Coupling," Science 314:1427-1429, 2006.
Hime et al., "Supporting Online Material for Solid-State Qubits with Current-Controlled Coupling," retrieved from http://www.sciencemag.org/cgi/content/full/314/5804/1427/DC1, 5 pages, Dec. 1, 2006.
Hutter et al., "Inductively Coupled Charge Qubits with Asymmetric SQUIDs," Jahrestagung der Deutschen Physikalischen Gesellschaft (DPG), 2005, 1 page —abstract only.
Il'ichev et al., "Continuous Monitoring of Rabi Oscillations in a Josephson Flux Qubit," *Physical Review Letters* 91(9): 097906-1—097906-4, week ending Aug. 29, 2003.
Johansson et al., "Systems, Devices, and Methods for Controllably Coupling Qubits," U.S. Appl. No. 61/024,125, filed Jan. 28, 2008, 31 pages.
Johnson et al., "Systems, Devices, and Methods for Controllable Coupling Qubits," U.S. Appl. No. 60/915,657, filed May 2, 2007, 33 pages.
Kim, "Controllable Coupling in Phase-Coupled Flux Qubits," Physical Review B 74:184501-1—184501-7, 2006.
Maassen van den Brink et al., "Analog Processor Comprising Quantum Devices," U.S. Appl. No. 11/317,838, filed Dec. 22, 2005, 90 pages.
Maassen van den Brink et al., "Mediated tunable coupling of flux qubits," *New Journal of Physics* 7:1-18, 2005.
Majer et al., "Spectroscopy on Two Coupled Superconducting Flux Qubits," Physical Review Letters 94:090501-1—090501-4, 2005.
Makhlin et al., "Quantum-state engineering with Josephson-junction devices," *Reviews of Modern Physics* 73(2): 357-400, Apr. 2001.
Mooij et al., "Josephson Persistent-Current Qubit," *Science* 285: 1036-1039, Aug. 13, 1999.
Nielsen et al., *Quantum Computation and Quantum Information*, Cambridge University Press, Cambridge, 2000, "7.8 Other implementation schemes," pp. 343-345.
Niskanen et al., "Tunable Coupling Scheme for Flux Qubits at the Optimal Point," Physical Review B 73:094506-1—094506-8, 2006.
Orlando et al., "Superconducting persistent-current qubit," *Physical Review B* 60(22): 15 398-15 413, Dec. 1, 1999.
Rose et al., "Systems, Devices and Methods for Interconnected Processor Topology," U.S. Appl. No. 12/013,192, filed Jan. 11, 2008, 47 pages.
Shor, "Introduction to Quantum Algorithms," AT&T Labs—Research, arXiv:quant-ph/0005003 v2, pp. 1-17, Jul. 6, 2001.
Suzuki et al., "Quantum Annealing of the Random-Field Ising Model Transverse Ferromagnetic Interactions," arXiv:quant-ph/0702214v1, 6 pages, 2007.
van Dam, "Quantum Computing In the 'Death Zone'?," Nature Physics 3:220-221, 2007.
van der Ploeg et al., "Controllable Coupling of Superconducting Flux Qubits," Physical Review Letters 98:057004-1—057004-4, 2007.
Wallquist et al., "Superconducting Qubit Network with Controllable Nearest-Neighbor Coupling," New Journal of Physics 7(178), 24 pages, 2005.
Wocjan et al., "Treating the Independent Set Problem by 2D Ising Interactions with Adiabatic Quantum Computing," arXiv:quant-ph/0302027v1, pp. 1-13, Feb. 4, 2003.
You et al., "Scalable Quantum Computing with Josephson Charge Qubits," Physical Review Letters 89(19):197902-1—197902-4, 2002.
Zagoskin et al., "Quantum Two-Level Systems in Josephson Junctions as Naturally Formed Qubits," Physical Review Letters 97:077001-1—077001-4, 2006.

* cited by examiner

PHYSICAL REALIZATIONS OF A UNIVERSAL ADIABATIC QUANTUM COMPUTER

BACKGROUND

Field

This disclosure generally relates to physical implementations of universal adiabatic quantum computers, and specifically relates to qubit-coupling architectures for universal adiabatic quantum computer processors.

Description of the Related Art

A Turing machine is a theoretical computing system, described in 1936 by Alan Turing. A Turing machine that can efficiently simulate any other Turing machine is called a Universal Turing Machine (UTM). The Church-Turing thesis states that any practical computing model has either the equivalent or a subset of the capabilities of a UTM.

A quantum computer is any physical system that harnesses one or more quantum effects to perform a computation. A quantum computer that can efficiently simulate any other quantum computer is called a Universal Quantum Computer (UQC).

In 1981 Richard P. Feynman proposed that quantum computers could be used to solve certain computational problems more efficiently than a UTM and therefore invalidate the Church-Turing thesis. See e.g., Feynman R. P., "Simulating Physics with Computers", International Journal of Theoretical Physics, Vol. 21 (1982) pp. 467-488. For example, Feynman noted that a quantum computer could be used to simulate certain other quantum systems, allowing exponentially faster calculation of certain properties of the simulated quantum system than is possible using a UTM.

Approaches to Quantum Computation

There are several general approaches to the design and operation of quantum computers. One such approach is the "circuit model" of quantum computation. In this approach, qubits are acted upon by sequences of logical gates that are the compiled representation of an algorithm. Circuit model quantum computers have several serious barriers to practical implementation. In the circuit model, it is required that qubits remain coherent over time periods much longer than the single-gate time. This requirement arises because circuit model quantum computers require operations that are collectively called quantum error correction in order to operate. Quantum error correction cannot be performed without the circuit model quantum computer's qubits being capable of maintaining quantum coherence over time periods on the order of 1,000 times the single-gate time. Much research has been focused on developing qubits with coherence sufficient to form the basic information units of circuit model quantum computers. See e.g., Shor, P. W. "Introduction to Quantum Algorithms", arXiv.org:quant-ph/0005003 (2001), pp. 1-27. The art is still hampered by an inability to increase the coherence of qubits to acceptable levels for designing and operating practical circuit model quantum computers.

Another approach to quantum computation involves using the natural physical evolution of a system of coupled quantum systems as a computational system. This approach does not make critical use of quantum gates and circuits. Instead, starting from a known initial Hamiltonian, it relies upon the guided physical evolution of a system of coupled quantum systems wherein the problem to be solved has been encoded in the terms of the system's Hamiltonian, so that the final state of the system of coupled quantum systems contains information relating to the answer to the problem to be solved. This approach does not require long qubit coherence times. Examples of this type of approach include adiabatic quantum computation, cluster-state quantum computation, one-way quantum computation, quantum annealing and classical annealing, and are described, for example, in Farhi, E. et al., "Quantum Adiabatic Evolution Algorithms versus Simulated Annealing" arXiv.org:quant-ph/0201031 (2002), pp 1-16.

Qubits

As mentioned previously, qubits can be used as fundamental units of information for a quantum computer. As with bits in UTMs, qubits can refer to at least two distinct quantities; a qubit can refer to the actual physical device in which information is stored, and it can also refer to the unit of information itself, abstracted away from its physical device. Examples of qubits include quantum particles, atoms, electrons, photons, ions, and the like.

Qubits generalize the concept of a classical digital bit. A classical information storage device can encode two discrete states, typically labeled "0" and "1". Physically these two discrete states are represented by two different and distinguishable physical states of the classical information storage device, such as direction or magnitude of magnetic field, current, or voltage, where the quantity encoding the bit state behaves according to the laws of classical physics. A qubit also contains two discrete physical states, which can also be labeled "0" and "1". Physically these two discrete states are represented by two different and distinguishable physical states of the quantum information storage device, such as direction or magnitude of magnetic field, current, or voltage, where the quantity encoding the bit state behaves according to the laws of quantum physics. If the physical quantity that stores these states behaves quantum mechanically, the device can additionally be placed in a superposition of 0 and 1. That is, the qubit can exist in both a "0" and "1" state at the same time, and so can perform a computation on both states simultaneously. In general, N qubits can be in a superposition of $2^N$ states. Quantum algorithms make use of the superposition property to speed up some computations.

In standard notation, the basis states of a qubit are referred to as the $|0\rangle$ and $|1\rangle$ states. During quantum computation, the state of a qubit, in general, is a superposition of basis states so that the qubit has a nonzero probability of occupying the $|0\rangle$ basis state and a simultaneous nonzero probability of occupying the $|1\rangle$ basis state. Mathematically, a superposition of basis states means that the overall state of the qubit, which is denoted $|\Psi\rangle$, has the form $|\Psi\rangle = a|0\rangle + b|1\rangle$, where a and b are coefficients corresponding to the probabilities $|a|^2$ and $|b|^2$, respectively. The coefficients a and b each have real and imaginary components, which allows the phase of the qubit to be characterized. The quantum nature of a qubit is largely derived from its ability to exist in a coherent superposition of basis states and for the state of the qubit to have a phase. A qubit will retain this ability to exist as a coherent superposition of basis states when the qubit is sufficiently isolated from sources of decoherence.

To complete a computation using a qubit, the state of the qubit is measured (i.e., read out). Typically, when a measurement of the qubit is performed, the quantum nature of the qubit is temporarily lost and the superposition of basis states collapses to either the $|0\rangle$ basis state or the $|1\rangle$ basis state and thus regaining its similarity to a conventional bit. The actual state of the qubit after it has collapsed depends on the probabilities $|a|^2$ and $|b|^2$ immediately prior to the readout operation.

Superconducting Qubits

There are many different hardware and software approaches under consideration for use in quantum computers. One hardware approach uses integrated circuits formed of superconducting materials, such as aluminum or niobium. The technologies and processes involved in designing and fabricating superconducting integrated circuits are similar in some respects to those used for conventional integrated circuits.

Superconducting qubits are a type of superconducting device that can be included in a superconducting integrated circuit. Typical superconducting qubits, for example, have the advantage of scalability and are generally classified depending on the physical properties used to encode information including, for example, charge and phase devices, phase or flux devices, hybrid devices, and the like. Superconducting qubits can be separated into several categories depending on the physical property used to encode information. For example, they may be separated into charge, flux and phase devices, as discussed in, for example Makhlin et al., 2001, *Reviews of Modern Physics* 73, pp. 357-400. Charge devices store and manipulate information in the charge states of the device, where elementary charges consist of pairs of electrons called Cooper pairs. A Cooper pair has a charge of 2e and consists of two electrons bound together by, for example, a phonon interaction. See e.g., Nielsen and Chuang, *Quantum Computation and Quantum Information*, Cambridge University Press, Cambridge (2000), pp. 343-345. Flux devices store information in a variable related to the magnetic flux through some part of the device. Phase devices store information in a variable related to the difference in superconducting phase between two regions of the phase device. Recently, hybrid devices using two or more of charge, flux and phase degrees of freedom have been developed. See e.g., U.S. Pat. No. 6,838,694 and U.S. Pat. No. 7,335,909.

Examples of flux qubits that may be used include rf-SQUIDs, which include a superconducting loop interrupted by one Josephson junction, or a compound junction (where a single Josephson junction is replaced by two parallel Josephson junctions), or persistent current qubits, which include a superconducting loop interrupted by three Josephson junctions, and the like. See e.g., Mooij et al., 1999, *Science* 285, 1036; and Orlando et al., 1999, *Phys. Rev. B* 60, 15398. Other examples of superconducting qubits can be found, for example, in Il'ichev et al., 2003, *Phys. Rev. Lett.* 91, 097906; Blatter et al., 2001, *Phys. Rev. B* 63, 174511, and Friedman et al., 2000, *Nature* 406, 43. In addition, hybrid charge-phase qubits may also be used.

The qubits may include a corresponding local bias device. The local bias devices may include a metal loop in proximity to a superconducting qubit that provides an external flux bias to the qubit. The local bias device may also include a plurality of Josephson junctions. Each superconducting qubit in the quantum processor may have a corresponding local bias device or there may be fewer local bias devices than qubits. In some embodiments, charge-based readout and local bias devices may be used. The readout device(s) may include a plurality of dc-SQUID magnetometers, each inductively connected to a different qubit within a topology. The readout device may provide a voltage or current. The dc-SQUID magnetometers including a loop of superconducting material interrupted by at least one Josephson junction are well known in the art.

Quantum Processor

A computer processor may take the form of an analog processor, for instance a quantum processor such as a superconducting quantum processor. A superconducting quantum processor may include a number of qubits and associated local bias devices, for instance two or more superconducting qubits. Further detail and embodiments of exemplary quantum processors that may be used in conjunction with the present systems, methods, and apparatus are described in US Patent Publication No. 2006-0225165, U.S. patent application Ser. No. 12/013,192, and U.S. Provisional Patent Application Ser. No. 60/986,554 filed Nov. 8, 2007 and entitled "Systems, Devices and Methods for Analog Processing."

A superconducting quantum processor may include a number of coupling devices operable to selectively couple respective pairs of qubits. Examples of superconducting coupling devices include rf-SQUIDs and dc-SQUIDs, which couple qubits together by flux. SQUIDs include a superconducting loop interrupted by one Josephson junction (an rf-SQUID) or two Josephson junctions (a dc-SQUID). The coupling devices may be capable of both ferromagnetic and anti-ferromagnetic coupling, depending on how the coupling device is being utilized within the interconnected topology. In the case of flux coupling, ferromagnetic coupling implies that parallel fluxes are energetically favorable and anti-ferromagnetic coupling implies that anti-parallel fluxes are energetically favorable. Alternatively, charge-based coupling devices may also be used. Other coupling devices can be found, for example, in US Patent Publication No. 2006-0147154 and U.S. patent application Ser. No. 12/017,995. Respective coupling strengths of the coupling devices may be tuned between zero and a maximum value, for example, to provide ferromagnetic or anti-ferromagnetic coupling between qubits.

Effective Qubit

Throughout this specification and the appended claims, the terms "effective qubit" and "effective qubits" are used to denote a quantum system that may be represented as a two-level system. Those of skill in the relevant art will appreciate that two specific levels may be isolated from a multi-level quantum system and used as an effective qubit. Furthermore, the terms "effective qubit" and "effective qubits" are used to denote a quantum system comprising any number of devices that may be used to represent a single two-level system. For example, a plurality of individual qubits may be coupled together in such a way that the entire set, or a portion thereof, of coupled qubits represents a single two-level system.

Basis

Throughout this specification and the appended claims, the terms "basis" and "bases" are used to denote a set or sets, respectively, of linearly independent vectors that may be combined to completely describe a given vector space. For example, the basis of standard spatial Cartesian coordinates comprises three vectors, the x-axis, the y-axis, and the z-axis. Those of skill in mathematical physics will appreciate that bases may be defined for operator spaces, such as those used to describe Hamiltonians.

Commutation

In quantum mechanics, two operators or bases (A and B, for example) are said to "commute" if they obey the relation:

$$[A,B]=AB-BA=0 \qquad \text{(a)}$$

Of particular interest are combinations of operators or bases that do not commute. That is, operators or bases (C and D, for example) for which:

$$[C,D]=CD-DC \neq 0 \qquad \text{(b)}$$

Throughout this specification and the appended claims, two bases "do not commute" if they follow the relation described in example (b) above.

Quantum Annealing

Quantum annealing is a computation method that may be used to find a low-energy state, typically preferably the ground state, of a system. Similar in concept to classical annealing, the method relies on the underlying principle that natural systems tend towards lower energy states because lower energy states are more stable. However, while classical annealing uses classical thermal fluctuations to guide a system to its global energy minimum, quantum annealing may use natural quantum fluctuations, such as quantum tunneling, to reach a global energy minimum more accurately or more quickly. It is known that the solution to a hard problem, such as a combinatorial optimization problem, may be encoded in the ground state of a system and therefore quantum annealing may be used to find the solution to such hard problems.

Adiabatic Quantum Computation

As mentioned previously, adiabatic quantum computation typically involves evolving a system from a known initial Hamiltonian (the Hamiltonian being an operator whose eigenvalues are the allowed energies of the system) to a final Hamiltonian by gradually changing the Hamiltonian. A simple example of an adiabatic evolution is:

$$H_e = (1-s)H_i + sH_f$$

where $H_i$ is the initial Hamiltonian, $H_f$ is the final Hamiltonian, $H_e$ is the evolution or instantaneous Hamiltonian, and s is an evolution coefficient which controls the rate of evolution. The coefficient s goes from 0 to 1, such that at the beginning of the evolution process the evolution Hamiltonian is equal to the initial Hamiltonian and at the end of the process the evolution Hamiltonian is equal to the final Hamiltonian. If the evolution is too fast, then the system can be excited to a higher state, such as the first excited state. In the present systems, methods, and apparatus, an "adiabatic" evolution is considered to be an evolution that satisfies the adiabatic condition, wherein the adiabatic condition is expressed as:

$$\dot{s}|\langle 1|dH_e/ds|0\rangle| = \delta g^2(s)$$

where $\dot{s}$ is the time derivative of s, g(s) is the difference in energy between the ground state and first excited state of the system (also referred to herein as the "gap size") as a function of s, and δ is a coefficient much less than 1.

The evolution process in adiabatic quantum computing may sometimes be referred to as annealing. The rate that s changes, sometimes referred to as an evolution or annealing schedule, is normally constant and slow enough that the system is always in the instantaneous ground state of the evolution Hamiltonian during the evolution, and transitions at anti-crossings (i.e., when the gap size is smallest) are avoided. Further details on adiabatic quantum computing systems, methods, and apparatus are described in U.S. Pat. No. 7,135,701.

Adiabatic quantum computation is a special case of quantum annealing for which the system begins and remains in its ground state throughout the evolution. Thus, those of skill in the art will appreciate that quantum annealing methods may generally be implemented on an adiabatic quantum computer, and vice versa. Throughout this specification, the term "adiabatic quantum computer" is used to describe a computing system that is designed to perform adiabatic quantum computations and/or quantum annealing.

Universal Adiabatic Quantum Computation

The concept of "universality" is understood in computer science to describe the scope or range of function of a computing system. A "universal computer" is generally considered to represent a computing system that can emulate any other computing system or, in other terms, a computing system that can be used for the same purposes as any other computing system. For the purposes of the present systems, methods and apparatus, the term "universal adiabatic quantum computer" is intended to describe an adiabatic quantum computing system that can simulate any unitary evolution.

BRIEF SUMMARY

At least one embodiment may be summarized as a quantum processor including a first set of qubits; a first set of coupling devices that are operable to selectively couple information from a first basis $A_1$ in a first qubit in the first set of qubits to a first basis $B_1$ in a second qubit in the first set of qubits thereby defining a first coupled basis $A_1B_1$; a second set of qubits; and a second set of coupling devices that are operable to selectively couple information from a second basis $A_2$ in a first qubit in the second set of qubits to a second basis $B_2$ in a second qubit in the second set of qubits thereby defining a second coupled basis $A_2B_2$, wherein at least one qubit in the first set of qubits is communicably coupled with at least one qubit in the second set of qubits, and wherein the first coupled basis $A_1B_1$ and the second coupled basis $A_2B_2$ do not commute.

The first coupled basis $A_1B_1$ may be a basis XX and the second coupled basis $A_2B_2$ may be a basis ZZ. The first coupled basis $A_1B_1$ may be a basis ZX and the second coupled basis $A_2B_2$ may be a basis XZ. The first set of qubits and the second set of qubits may at least partially overlap, such that at least one qubit may be simultaneously included in both the first and second sets of qubits. The quantum processor may further include a defined readout basis wherein at least one of the bases $A_1$, $B_1$, $A_2$, and $B_2$ is in a same basis as the readout basis. At least one of the qubits of the first set of qubits may be an effective qubit comprised of a plurality of individual qubits and individual couplers that couple the individual qubits to function effectively as a single qubit.

At least one embodiment may be summarized as a quantum processor including a plurality of qubits; a first programming interface that is communicably coupled to a Z-degree of freedom of at least one of the qubits; a second programming interface that is communicably coupled to an X-degree of freedom of at least one of the qubits; a first set of coupling devices, wherein each of the coupling devices in the first set of coupling devices is configured to communicably couple information between the Z-degree of freedom of at least two of the qubits; and a second set of coupling devices, wherein each of the coupling devices in the second set of coupling devices is configured to communicably couple information between the X-degree of freedom of at least two of the qubits.

The plurality of qubits may include a number of superconducting qubits. Each of the superconducting qubits may include a respective qubit loop formed by a closed superconducting current path and a respective compound Josephson junction that interrupts the qubit loop and is formed by a closed superconducting current path that is interrupted by at least two Josephson junctions, and wherein a first programming interface is communicably coupled to the qubit loop of at least one of the superconducting qubits and a second programming interface is communicably coupled to the compound Josephson junction of at least one of the superconducting qubits. Each of the coupling devices in the first set of coupling devices may be configured to couple magnetic flux signals between the qubit loops of a respective pair of the superconducting qubits. Each of the coupling devices in the second set of coupling devices may be configured to couple charge signals between a respective pair of the superconducting qubits. At least one of the qubits of the first set of qubits may be an effective qubit comprised of a plurality of individual qubits and individual couplers that couple the individual qubits to function effectively as a single qubit.

At least one embodiment may be summarized as a quantum processor including a plurality of qubits; a first programming interface that is communicably coupled to a Z-degree of freedom of at least one of the qubits; a second programming interface that is communicably coupled to an X-degree of freedom of at least one of the qubits; and a plurality of coupling devices, wherein each of the coupling devices is configured to communicably couple information between the Z-degree of freedom of a first one of the qubits and the X-degree of freedom of a second one of the qubits.

The plurality of qubits may include a number of superconducting qubits. Each of the superconducting qubits may include a respective qubit loop formed by a closed superconducting current path and a respective compound Josephson junction that interrupts the qubit loop and is formed by a closed superconducting current path that is interrupted by at least two Josephson junctions, and wherein a first programming interface is communicably coupled to the qubit loop of at least one of the superconducting qubits and a second programming interface is communicably coupled to the compound Josephson junction of at least one of the superconducting qubits. Each of the coupling devices may be configured to couple magnetic flux signals between the qubit loop of a first one of the superconducting qubits and the compound Josephson junction of a second one of the superconducting qubits. At least one of the qubits of the first set of qubits may be an effective qubit comprised of a plurality of individual qubits and individual couplers that couple the individual qubits to function effectively as a single qubit.

At least one embodiment may be summarized as a method of simulating coupling interactions between at least two effective qubits, including coupling information from a basis A in a first qubit to a basis B in a mediator qubit; and coupling information from the basis B in the mediator qubit to a basis C in a second qubit, thereby simulating AC coupling between the basis A in the first qubit and the basis C in the second qubit.

The coupling between the first qubit and the mediator qubit may be an XX coupling; the coupling between the mediator qubit and the second qubit may be a ZZ coupling; and the resulting simulated coupling may be an XZ coupling between the first and second qubits. The coupling between the first qubit and the mediator qubit may be an XZ coupling; the coupling between the mediator qubit and the second qubit may be a ZX coupling; and the resulting simulated coupling may be an XX coupling between the first and second qubits. The coupling between the first qubit and the mediator qubit may be a ZX coupling; the coupling between the mediator qubit and the second qubit may be an XZ coupling; and the resulting simulated coupling may be a ZZ coupling between the first and second qubits. Coupling information from a basis A in a first qubit to a basis B in a mediator qubit may include coupling the information from the basis A in the first qubit which is coupled to at least one other qubit to function effectively as a single effective qubit.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

Figure 1:
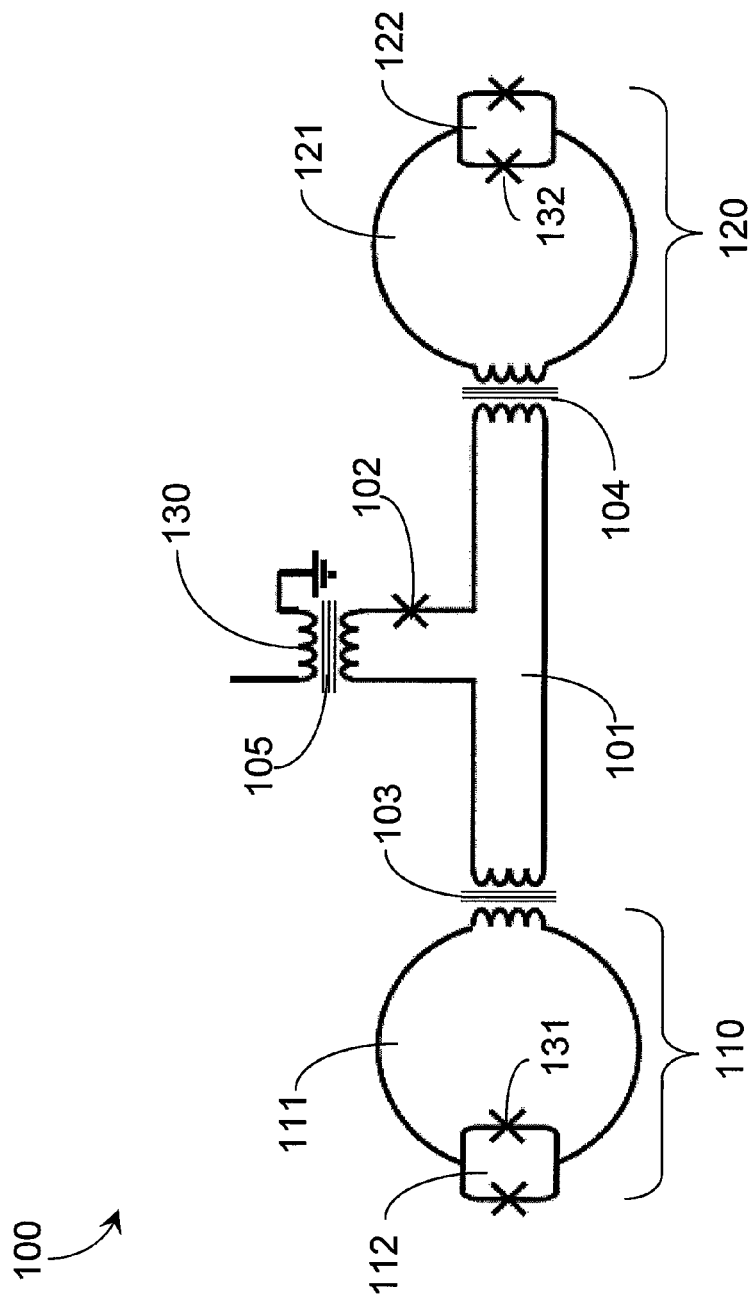
FIG. 1 shows a schematic diagram of a conventional controllable ZZ-coupler.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with quantum processors, such as quantum devices, coupling devices and control systems including microprocessors and drive circuitry have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

The various embodiments described herein provide systems, methods and apparatus for universal adiabatic quantum computation. In accordance with the present systems, methods and apparatus, a universal adiabatic quantum computer processor comprises a plurality of qubits and qubit-coupling devices ("couplers") that are used to communicatively couple information between qubits. The architecture of the qubit-coupling (that is, which qubits are coupled together and in what way) influences the capabilities and performance of the quantum processor. In particular, the architecture of the qubit-coupling influences the Hamiltonians that may be realized by the quantum processor.

Adiabatic quantum computation may be implemented in a variety of different ways. Examples of particular implementations of adiabatic quantum computation are described in U.S. patent application Ser. No. 11/317,838 and Wocjan et al., 2003, "Treating the Independent Set Problem by 2D Ising Interactions with Adiabatic Quantum Computing," arXiv.org: quant-ph/0302027 (2003), pp. 1-13, where the qubit-coupling architecture is used to realize a 2-local Ising Hamiltonian with 1-local transverse field as given in equation 1:

$$H = \sum_{i=1}^{n} h_i \sigma_i^z + \sum_{i=1}^{n} \Delta_i \sigma_i^x + \sum_{i,j=1}^{n} J_{ij} \sigma_i^z \sigma_j^z \quad (1)$$

Here, n represents the number of qubits, $\sigma_i^z$ is the Pauli Z-matrix for the $i^{th}$ qubit, $\sigma_i^x$ is the Pauli X-matrix for the $i^{th}$ qubit, and $h_i$, $\Delta_i$, and $J_{i,j}$ are dimensionless local fields coupled to each qubit. The $h_i$ terms in equation 1 may be physically realized by coupling signals or fields to the Z-basis of each $i^{th}$ qubit. The $\Delta_i$ terms in equation 1 may be physically realized by coupling signals or fields to the X-basis of each $i^{th}$ qubit. The $J_{ij}$ terms in equation 1 may be physically realized by coupling the Z-bases of pairs of qubits (qubits i and j, respectively) together.

The behavior of superconducting qubits is typically controlled by a plurality of parameters or "degrees of freedom." These degrees of freedom may be programmed using a programming system, such as the programming systems described in U.S. patent application Ser. No. 11/950,276. Furthermore, these degrees of freedom provide means by or through which the superconducting qubits may interact with one another. A first qubit may interact with a second qubit by the coupling of information between a degree of freedom in the first qubit and a degree of freedom in the second qubit. The influence or effect of such an interaction depends on the type of information being coupled and the degrees of freedom that are involved.

As is understood in the art, each degree of freedom may correspond to a respective basis element defining the Hilbert space of a qubit. In the case of a superconducting flux qubit, the persistent current in the qubit loop is commonly associated with the Z-direction in the Hilbert space. Thus, a Z-Z (or "ZZ") interaction may be realized between two superconducting flux qubits by coupling information relating to the persistent current in the qubit loop of a first qubit to the qubit loop of a second qubit. Communicable coupling of the Z-degree of freedom of a pair of superconducting qubits may be realized by a superconducting ZZ-coupler, such as those described in Harris, R. et al., "Sign and Magnitude Tunable Coupler for Superconducting Flux Qubits", arXiv.org: cond-mat/0608253 (2006), pp. 1-5, and van der Brink, A. M. et al., "Mediated tunable coupling of flux qubits," New Journal of Physics 7 (2005) 230. A brief description of a conventional ZZ-coupling device is now provided.

FIG. 1 shows a schematic diagram of a conventional controllable ZZ-coupler 100. This coupler 100 is a loop of superconducting material 101 interrupted by a Josephson junction 102 and is used to couple a first qubit 110 and a second qubit 120 for use in a computer processor. First qubit 110 is comprised of a loop of superconducting material 111 interrupted by a compound Josephson junction 112 and is coupled to controllable coupler 100 through the exchange of flux 103 between coupler 100 and first qubit 110. Second qubit 120 is comprised of a loop of superconducting material 121 interrupted by a compound Josephson junction 122 and is coupled to controllable coupler 100 through the exchange of flux 104 between coupler 100 and second qubit 120. Loop of superconducting material 101 is threaded by flux 105 created by electrical current flowing through a magnetic flux inductor 130.

ZZ-coupler 100 couples information regarding the persistent current in the qubit loop 111 of qubit 110 to the persistent current in the qubit loop 121 of qubit 120, and vice versa. Thus, ZZ-coupler 100 couples information between the Z-degree of freedom in qubit 110 and the Z-degree of freedom in qubit 120.

Flux 105 produced by magnetic flux inductor 130 threads loop of superconducting material 101 and controls the state of controllable coupler 100. Controllable coupler 100 is capable of producing a zero coupling between first qubit 110 and second qubit 120, an anti-ferromagnetic coupling between first qubit 110 and second qubit 120, and a ferromagnetic coupling between first qubit 110 and second qubit 120.

Variations and, for some applications, improvements to the ZZ-coupler design shown in FIG. 1 are presented in U.S. patent application Ser. No. 12/017,995, and U.S. Provisional Patent Application Ser. No. 60/915,657, filed May 2, 2007 and entitled "Systems, Devices, and Methods for Controllably Coupling Qubits." Those of skill in that art will appreciate that the present systems, methods and apparatus teach qubit-coupling architectures for universal adiabatic quantum computation that may be implemented using a wide-variety of coupling devices including, but not limited to, the coupling devices described and/or referenced herein.

The Hamiltonian described in equation 1 may be implemented over a wide variety of adiabatic quantum computing applications; however, it was shown in S. Bravyi et al., "The Complexity of Stoquastic Local Hamiltonian Problems", arXiv.org:quant-ph/0606140 (2006), pp. 1-21 that this Hamiltonian cannot be used to construct a universal adiabatic quantum computer. Two Hamiltonians that can be used for universal adiabatic quantum computation are presented in Biamonte et al., "Realizable Hamiltonians for Universal Adiabatic Quantum Computation", arXiv.org:quant-ph/0704.1287 (2007), pp. 1-4. The present systems, methods and apparatus generally describe qubit-coupling architectures that may be used to physically realize these Hamiltonians. As an example, the present systems, methods and apparatus describe superconducting qubit-coupling architectures that may be used to physically realize these Hamiltonians with superconducting quantum processors.

The two Hamiltonians presented in Biamonte et al. are given in equations 2 and 3:

$$H = \sum_{i}^{n} h_i \sigma_i^z + \sum_{i}^{n} \Delta_i \sigma_i^x + \sum_{i,j}^{n} J_{ij} \sigma_i^z \sigma_j^z + \sum_{i,j}^{n} K_{ij} \sigma_i^x \sigma_j^x \quad (2)$$

$$H = \sum_{i}^{n} h_i \sigma_i^z + \sum_{i}^{n} \Delta_i \sigma_i^x + \sum_{i,j}^{n} J_{ij} \sigma_i^z \sigma_j^z + \sum_{i,j}^{n} K_{ij} \sigma_i^z \sigma_j^x \quad (3)$$

where $K_{i,j}$ is a dimensionless local field coupled to each qubit (similar to $J_{i,j}$). In Biamonte et al., both of these Hamiltonians are proven to be QMA-complete and suitable for universal adiabatic quantum computation.

While the 2-local Ising Hamiltonian with 1-local transverse field given in equation 1 is known not to be universal, it can be made universal by adding a 2-local transverse $\sigma^x \sigma^x$ coupling term as in equation 2. As previously described, the persistent current in the qubit loop of a superconducting flux qubit is commonly associated with the Z-direction of the qubit's Hilbert space. On the other hand, the flux threading the CJJ of a superconducting flux qubit controls the qubit's tunnel splitting, which is commonly associated with the X-direction of the qubit's Hilbert space. In accordance with the present systems, methods and apparatus, a qubit-coupling architecture that is used to realize a 2-local Ising Hamiltonian with 1-local transverse field (equation 1) may be made universal by coupling information between the X-bases of qubits using an XX-coupler. Embodiments of superconducting XX-couplers are fully described in U.S. Provisional Patent Application Ser. No. 61/024,125, filed Jan. 28, 2008 and entitled "Systems, Devices, And Methods For Controllably Coupling Qubits." A description of exemplary XX-coupling devices is now provided.

Figure 2:
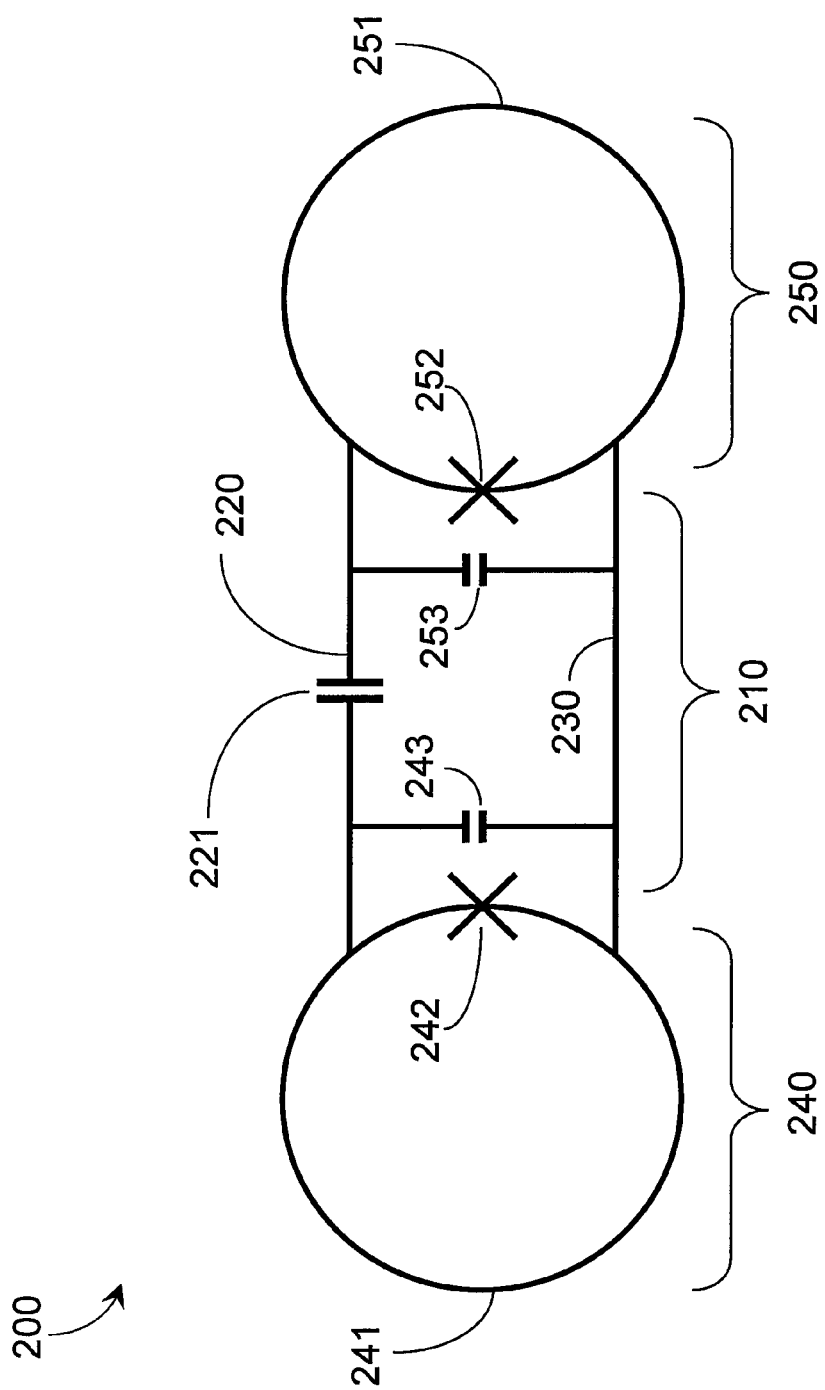
FIG. 2 is a schematic diagram of a system that includes a superconducting coupler capable of transverse XX-coupling between two superconducting qubits, according to one illustrated embodiment.

It was shown in Averin et al., Physical Review Letters 91, 057003 (2003) that tunable capacitive coupling can be used to couple information between superconducting qubits. FIG. 2 is a schematic diagram of a system 200 that includes a superconducting coupler 210 capable of providing transverse XX-coupling between a qubit 240 and a qubit 250 and is used to transversely couple qubit 240 and qubit 250. Qubit 240 may be comprised of a loop of superconducting material 241 interrupted by at least one Josephson junction 242 having an intrinsic capacitance graphically represented by a capacitor symbol 243. Qubit 250 may be comprised of a loop of superconducting material 251 interrupted by at least one Josephson junction 252 having an intrinsic capacitance graphically represented by a capacitor symbol 253. Qubit 240 and qubit 250 are connected by a conductive path 220 and a conductive path 230. The conductive paths 220, 230 may, for example, take the form of one or more wires or traces of material that is superconducting below a critical temperature, to form superconductive paths. Superconducting path 220 is interrupted by a coupling capacitor 221 having a capacitance of magnitude $C_c$.

It would be desirable if system 200 was tunable. By modifying system 200 to incorporate either a tunable inductance 311 and a capacitance 312, (as is shown in system 300 of FIG. 3) or a compound Josephson junction loop 415 (as is shown in system 400 of FIG. 4) a tunable transverse coupler may be achieved.

Figure 3:
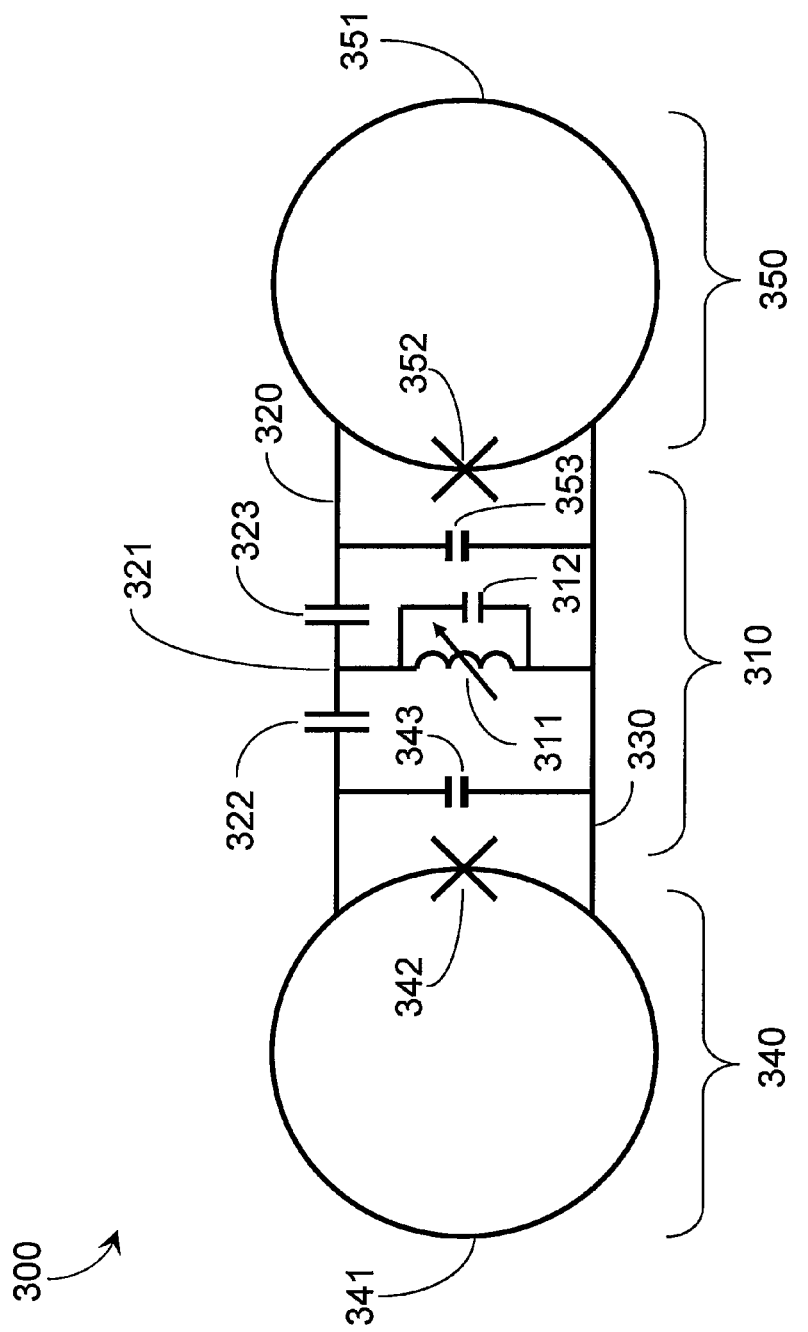
FIG. 3 is a schematic diagram of a system that includes a tunable superconducting coupler capable of tunable transverse XX-coupling between two superconducting qubits, according to one illustrated embodiment.

An exemplary embodiment of a tunable XX-coupler is shown in the schematic diagram of FIG. 3. A system 300 has a controllable transverse coupler 310 capable of providing transverse XX-coupling between a qubit 340 and a qubit 350 and is used to transversely couple qubit 340 and qubit 350. Qubit 340 may be comprised of a loop of superconducting material 341 interrupted by at least one Josephson junction 342 having an intrinsic capacitance graphically represented by a capacitor symbol 343. Qubit 350 may be comprised of a loop of superconducting material 351 interrupted by at least one Josephson junction 352 having an intrinsic capacitance graphically represented by a capacitor symbol 353. Qubit 340 and qubit 350 are connected by a conductive path 320 and a conductive path 330. The conductive paths 320, 330 may, for example, take the form of one or more wires or traces of material that are superconducting below a critical temperature, to form superconductive paths. Superconducting path 320 includes a coupling capacitance 322 and a coupling capacitance 323. The coupling capacitances 322, 323 may take the form of discrete capacitors. Alternatively, coupling capacitances 322, 323 may take the form of inherent, intrinsic or parasitic capacitances (commonly referred to as parasitic capacitance herein) associated with the first superconducting path 320. Tunable inductance 311 and capacitance 312 connect superconducting path 320, at a node 321 located between coupling capacitors 322, 323, to superconducting path 330. The tunable inductance 311 may, for example, be provided by a tunable or adjustable inductor.

The tunability of controllable transverse coupler 310 is achieved by adjusting the impedance shunting the path through coupling capacitors 322, 323. This is achieved by varying the tunable impedance 311.

Figure 4:
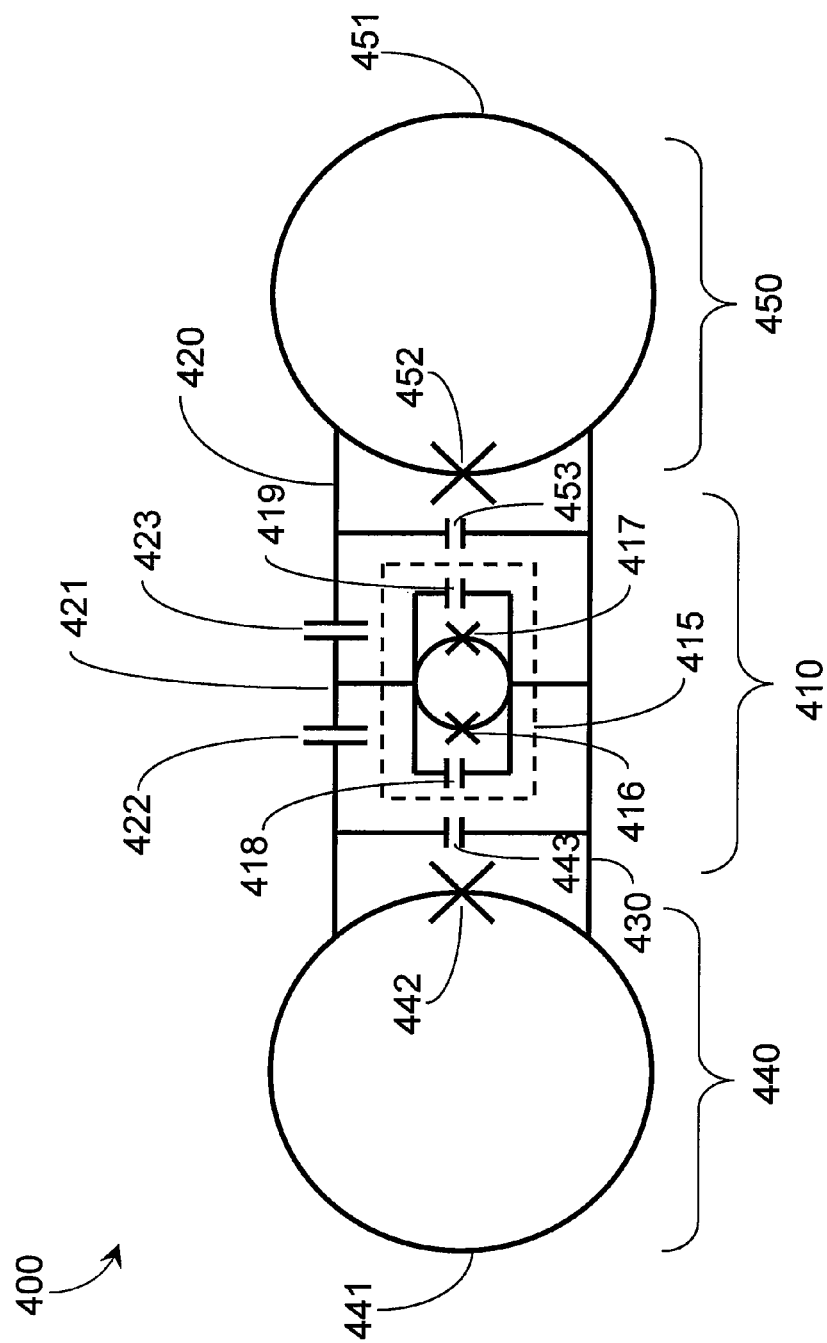
FIG. 4 is a schematic diagram of a system that includes a tunable superconducting coupler capable of tunable transverse XX-coupling between two superconducting qubits, according to another illustrated embodiment.

A further exemplary embodiment of a tunable XX-coupler is shown in the schematic diagram of FIG. 4. A system 400 includes a controllable superconducting coupler 410 capable of providing transverse XX-coupling between a qubit 440 and a qubit 450 and is used to transversely couple qubit 440 and qubit 450. Qubit 440 may be comprised of a loop of superconducting material 441 interrupted by at least one Josephson junction 442 having an intrinsic capacitance graphically represented by a capacitor symbol 443. Qubit 450 may be comprised of a loop of superconducting material 451 interrupted by at least one Josephson junction 452 having an intrinsic capacitance graphically represented by a capacitor symbol 453. Qubit 440 and qubit 450 are connected by a conductive path 420 and a conductive path 430. Conductive paths 420, 430 may, for example, take the form of one or more wires or traces of material that is superconducting below a critical temperature, to form superconductive paths. Superconducting path 420 includes a coupling capacitance 422 and a coupling capacitance 423. Coupling capacitances 422, 423 may take the form of discrete capacitors. Alternatively, coupling capacitances 422, 423 may take the form of inherent, intrinsic or parasitic capacitances associated with the first superconducting path 420. A compound Josephson junction loop 415, having a first Josephson junction 416 with an intrinsic capacitance graphically represented by a capacitor symbol 418 and a second Josephson junction 417 with an intrinsic capacitance graphically represented by a capacitor symbol 419, connects superconducting path 420, at a node 421 located between coupling capacitor 422 and coupling capacitor 423, to superconducting path 430. There may exist additional coupling capacitors along superconducting path 430. One coupling capacitor may be positioned along superconducting path 430 between qubit 440 and compound Josephson junction loop 415. There may be a voltage difference between the two leads of compound Josephson junction loop 415. Compound Josephson junction loop 415 may be seen as a shunt between superconducting paths 420, 430.

The tunability of tunable coupler 410 is achieved by adjusting the impedance shunting the path through coupling capacitors 422, 423. By changing the flux threading compound Josephson junction loop 415, the impedance shunting the path through coupling capacitors 422, 423 is changed. Therefore, by changing the amount of flux threading compound Josephson junction loop 415, the coupling strength is affected.

Figure 5:
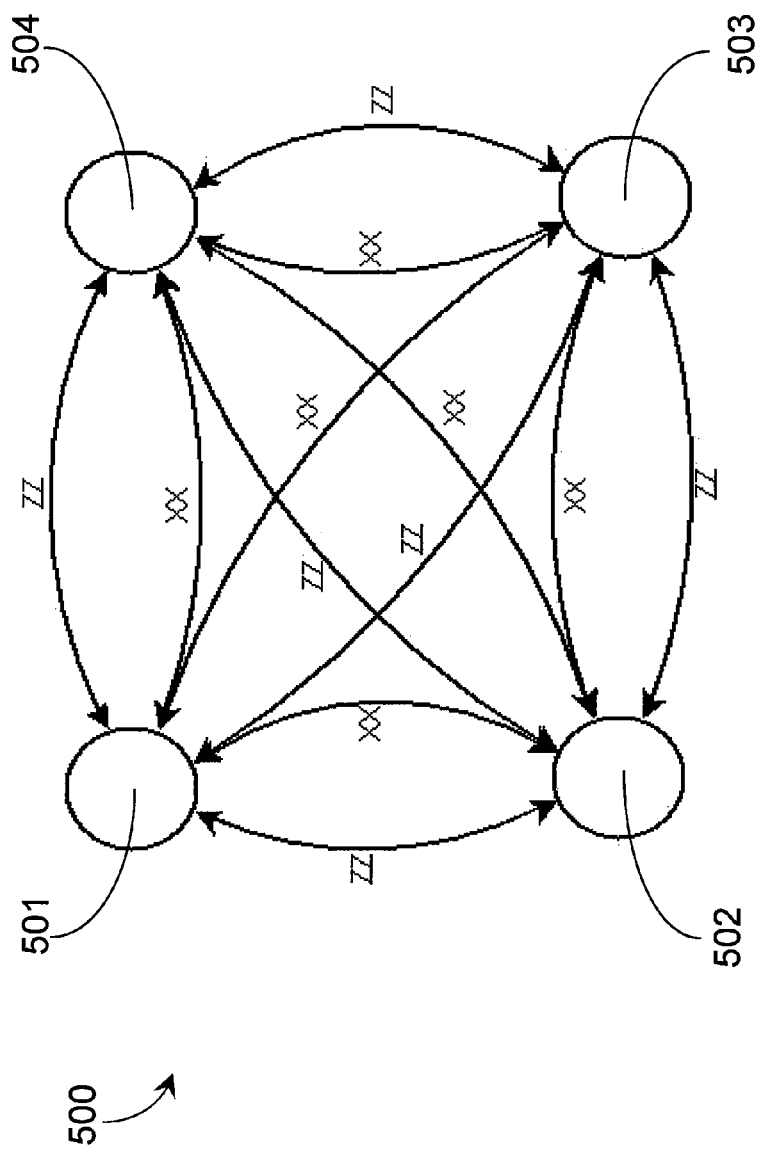
FIG. 5 is a functional diagram of an embodiment of a universal qubit-coupling architecture that incorporates ZZ- and XX-coupling, according to one illustrated embodiment.

In accordance with the present systems, methods and apparatus, the universal Hamiltonian described by equation 2 may be physically realized in a quantum processor with ZZ- and XX-coupling between qubits (in addition to coupling the $\sigma^z$ and $\sigma^x$ terms into each qubit). FIG. 5 is a functional diagram of an embodiment of a universal qubit-coupling architecture 500 that incorporates ZZ- and XX-coupling. Coupling architecture 500 shows four effective qubits 501-504, though those of skill in the relevant art will recognize that a similar coupling scheme may be applied to any number of qubits in a quantum processor. For instance, in an array or lattice of qubits, coupling architecture 500 would provide both XX- and ZZ-coupling between nearest and next-nearest neighboring pairs of effective qubits. In FIG. 5, the couplers are represented by solid lines joining two effective qubits and in each case the type of coupling ("XX" or "ZZ") is indicated next to the solid line. ZZ- and XX-couplers do not commute, that is, $[ZZ,XX] \neq 0$.

As previously stated, those of skill in the art will appreciate that a similar coupling architecture may be applied in a quantum processor involving a different number of qubits. However, it is recognized in U.S. patent application Ser. No. 12/013,192 that the operation of a single qubit device may be adversely affected if it is connected to too many couplers. In such instances, it is possible to combine two or more individual qubit devices as one effective qubit such that the desired number of couplers may be applied without adversely affecting the operation of the qubit devices.

The universal Hamiltonian described by equation 2 may be physically realized in a quantum processor by implementing the qubit-coupling architecture shown in FIG. 5. However, as previously indicated, it is also necessary to couple the $\sigma^z$ and $\sigma^x$ terms from equation 2 into each qubit. Techniques for coupling such signals into superconducting qubits are known in the art. A brief description of these techniques is now provided.

Figure 6:
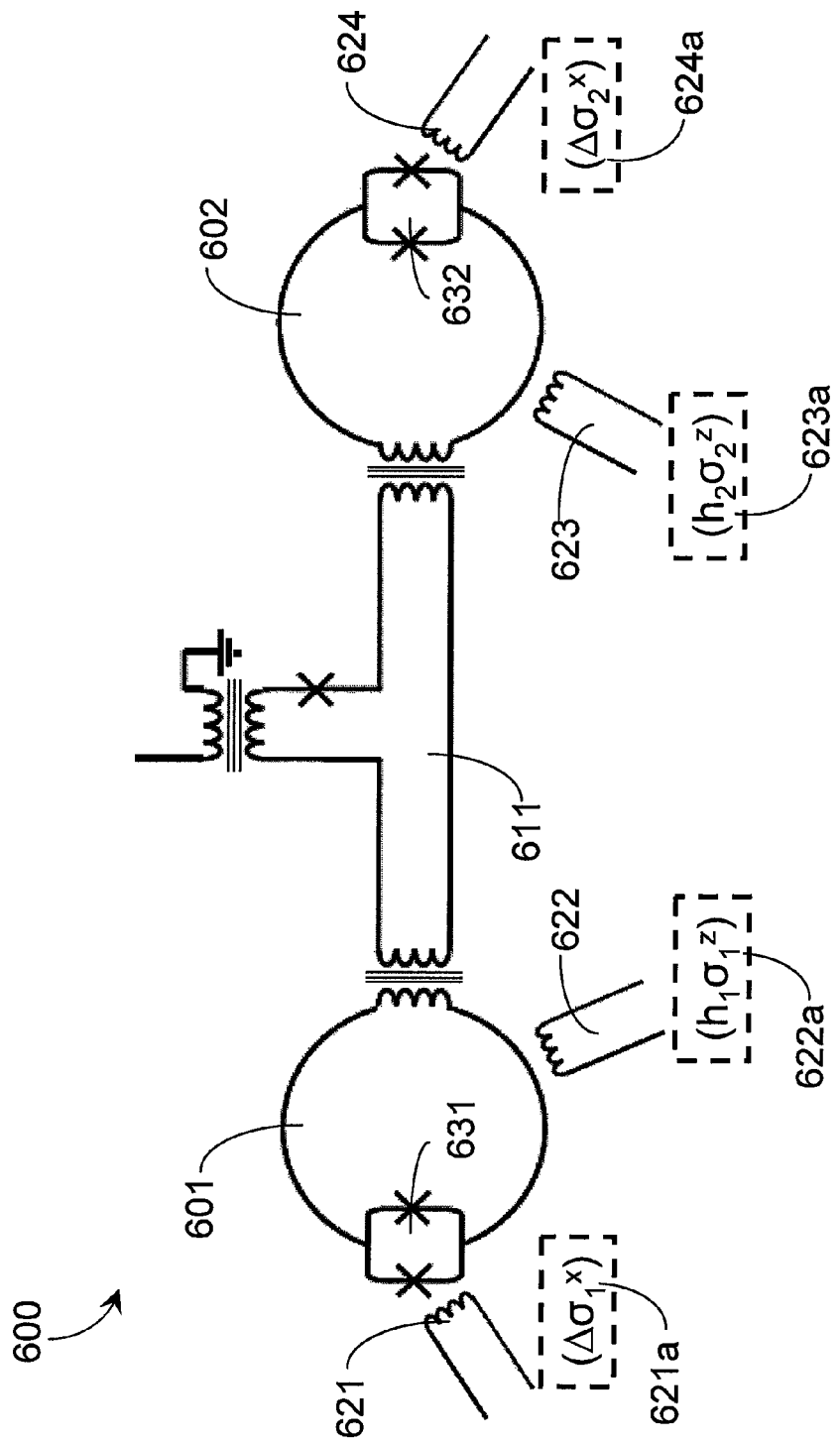
FIG. 6 is a schematic diagram of a portion of a conventional superconducting quantum processor designed for adiabatic quantum computation (and/or quantum annealing).

FIG. 6 is a schematic diagram of a portion of a conventional superconducting quantum processor 600 designed for adiabatic quantum computation (and/or quantum annealing). The portion of superconducting quantum processor 600 shown in FIG. 6 includes two superconducting qubits 601, 602 and a tunable ZZ-coupler 611 coupling information therebetween. While the portion of quantum processor 600 shown in FIG. 6 includes only two qubits 601, 602 and one coupler 611, those of skill in the art will appreciate that quantum processor 600 may include any number of qubits, and any number of coupling devices coupling information therebetween.

The portion of quantum processor 600 shown in FIG. 6 may be implemented to physically realize the Hamiltonian described by equation 1, which includes the same $\sigma^z$ and $\sigma^x$ terms as in the Hamiltonians described by equations 2 and 3. In order to provide these $\sigma^z$ and $\sigma^x$ terms, quantum processor 600 includes programming interfaces 621-624 that are used to configure and control the state of quantum processor 600. Each of programming interfaces 621-624 may be realized by a respective inductive coupling, as illustrated, to a programming system (not shown). Such a programming system may be separate from quantum processor 600, or it may be included locally (i.e., on-chip with quantum processor 600) as described in U.S. patent application Ser. No. 11/950,276.

In the programming of quantum processor 600, programming interfaces 621 and 624 may each be used to couple a flux signal into a respective compound Josephson junction 631, 632 of qubits 601 and 602, thereby realizing the $\Delta_i$ terms in the system Hamiltonian. This coupling provides the $\sigma^x$ terms of equations 1-3. Similarly, programming interfaces 622 and 623 may each be used to couple a flux signal into a respective qubit loop of qubits 601 and 602, thereby realizing the $h_i$ terms in the system Hamiltonian. This coupling provides the $\sigma^z$ terms of equations 1-3. In FIG. 1, the contribution of each of programming interfaces 621-624 to the system Hamiltonian is indicated in boxes 621a-624a, respectively.

Those of skill in the art will appreciate that the Hamiltonian described by equation 2 may be physically realized by coupling architectures that differ from coupling architecture 500 shown in FIG. 5. For instance, in some embodiments it may be appropriate to include XX-coupling between some qubits and ZZ-coupling between some qubits, but not necessarily both XX- and ZZ-coupling between every pair of coupled qubits. In some embodiments, it may be preferred to use only one type of coupling between any given pair of qubits, thereby providing a coupling architecture in which XX-coupling and ZZ-coupling are both present but never shared between the same pair of qubits.

In accordance with the present systems, methods and apparatus, quantum processor architectures that provide physical realizations of the universal Hamiltonian described by equation 2 have been described. However, in a further aspect of the present systems, methods and apparatus, quantum processor architectures that provide physical realizations of the universal Hamiltonian described by equation 3 are also described.

The universal Hamiltonian described by equation 3 includes the same $\sigma^z$ and $\sigma^x$ terms as described for equation 2, but substitutes $\sigma^z\sigma^x$ and $\sigma^x\sigma^z$ terms for the $\sigma^z\sigma^z$ and $\sigma^x\sigma^x$ terms of equation 2. In accordance with the present systems, methods and apparatus, the universal Hamiltonian that is described by equation 3 may be physically implemented by a qubit-coupling architecture that includes ZX- and XZ-coupling between qubits (in addition to coupling the $\sigma^z$ and $\sigma^x$ terms into each qubit). To this end, ZX- and XZ-couplers may be used. Descriptions of XZ- and ZX-couplers are provided in U.S. patent application Ser. No. 12/098,347, filed Apr. 4, 2008, and entitled "SYSTEMS, METHODS AND APPARATUS FOR ANTI-SYMMETRIC QUBIT-COUPLING". A description of exemplary XZ- and ZX-coupling devices is now provided.

Figure 7:
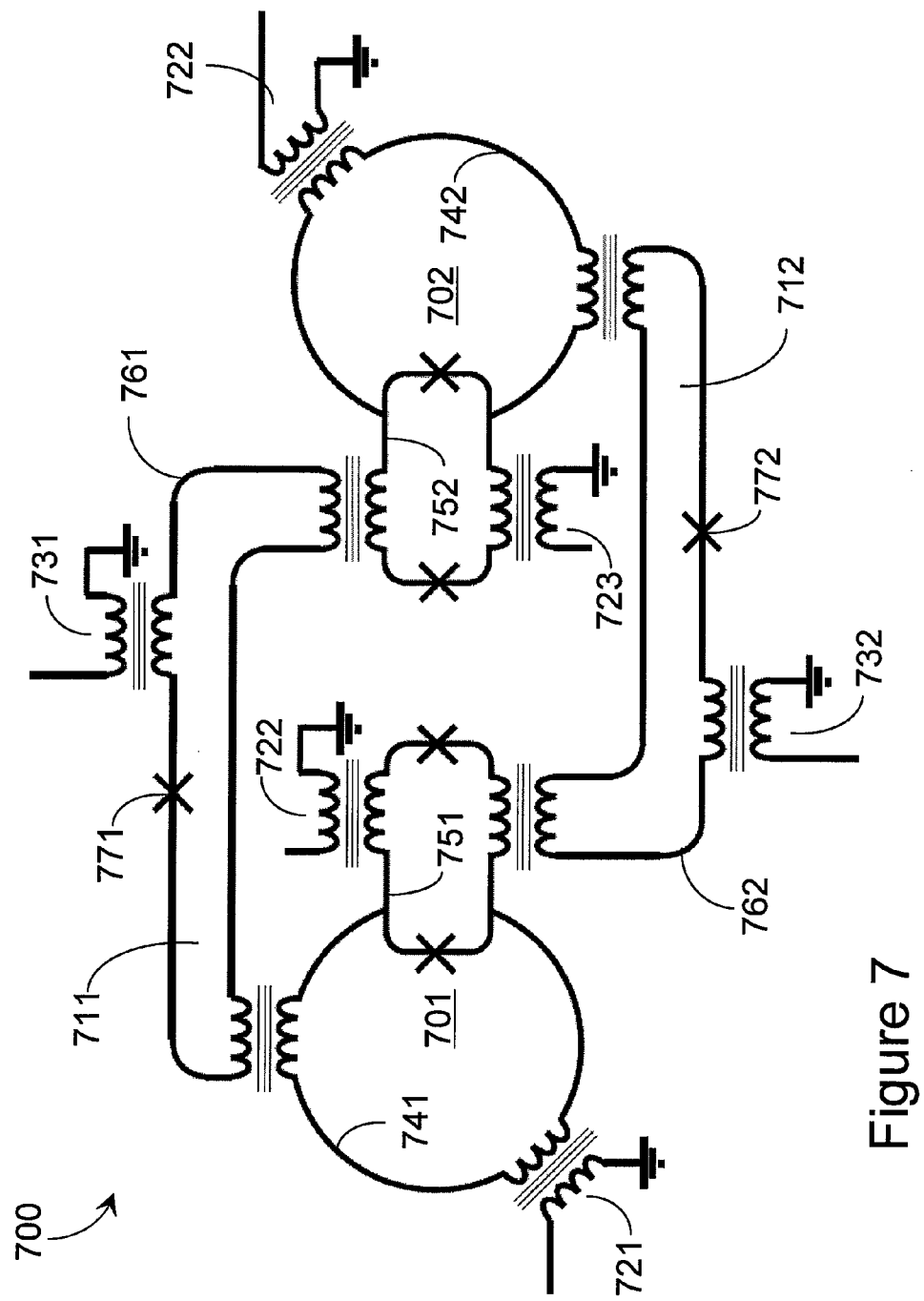
FIG. 7 is a schematic diagram of an embodiment of a system that includes two superconducting qubits and both a ZX-coupler and an XZ-coupler, each of which is configured to communicably couple information between the two qubits, according to one illustrated embodiment.

FIG. 7 is a schematic diagram of an embodiment of a system 700 that includes two superconducting qubits 701, 702 and both a ZX-coupler 711 and an XZ-coupler 712, each of which is configured to communicably couple information between qubits 701 and 702. Qubit 701 includes a qubit loop 741 formed by a closed superconducting current path that is interrupted by a compound Josephson junction 751. Similarly, qubit 702 includes a qubit loop 742 formed by a closed superconducting current path that is interrupted by a compound Josephson junction 752. Similar to portion of superconducting quantum processor 600 shown in FIG. 6, system 700 shown in FIG. 7 includes programming interfaces 721-724 which may be used to realize the $\sigma^z$ and $\sigma^x$ terms of the universal Hamiltonian described by equation 3. Each of programming interfaces 721-724 may be realized by a respective inductive coupling, as illustrated, to a programming system (not shown). Programming interfaces 721 and 724 may each be used to couple a flux signal into a respective compound Josephson junction 751, 752 of qubits 701 and 702, thereby realizing the $\Delta_i$ terms in the system Hamiltonian. This coupling provides the $\sigma^x$ terms of equation 3. Similarly, programming interfaces 722 and 723 may each be used to couple a flux signal into a respective qubit loop of qubits 701 and 702, thereby realizing the $h_i$ terms in the system Hamiltonian. This coupling provides the $\sigma^z$ terms of equation 3.

In accordance with the present systems, methods and apparatus, system 700 shown in FIG. 7 includes an exemplary embodiment of a ZX-coupler 711 and an exemplary embodiment of an XZ-coupler 712. ZX-coupler 711 includes a closed superconducting current path 761 that is inductively coupled to both the qubit loop 741 of qubit 701 and the compound Josephson junction 752 of qubit 702. Thus, ZX-coupler 711 provides coupling between the Z-degree of freedom in qubit 701 and the X-degree of freedom in qubit 702 by inductively coupling the persistent current in the qubit loop 741 of qubit 701 into the compound Josephson junction 752 of qubit 702. If qubit 701 is bi-stable, then the direction of persistent current flow in qubit loop 741 will influence the magnitude of the tunneling rate in the compound Josephson junction 752 of qubit 702.

In many applications, it is preferred to have "tunable" control over the coupling strength between qubits. In the case of ZX-coupler 711, tunability is realized by two tuning elements: closed superconducting current path 761 is interrupted by at least one Josephson junction 771 and closed superconducting current path 761 is inductively coupled to a programming interface 731. These tuning elements allow the susceptibility of ZX-coupler 711 to be tuned as described in A. Maassen van den Brink et al., New J. Phys. 7, 230 (2005).

Those of skill in the art will appreciate that the structure and operation of XZ-coupler 712 is effectively the "mirror-image" of the structure and operation of ZX-coupler 711. That is, XZ-coupler 712 includes a closed superconducting current path 762 that is inductively coupled to both the qubit loop 742 of qubit 702 and the compound Josephson junction 751 of qubit 701. Thus, XZ-coupler 712 provides coupling between the X-degree of freedom in qubit 701 and the Z-degree of freedom in qubit 702 by inductively coupling the persistent current in the qubit loop 742 of qubit 702 into the compound Josephson junction 751 of qubit 701. If qubit 702 is bi-stable, then the direction of persistent current flow in qubit loop 742 will influence the magnitude of the tunneling rate in the compound Josephson junction 751 of qubit 701. XZ-coupler 712 may also be made tunable by the combination of two tuning elements: closed superconducting current path 762 is interrupted by at least one Josephson junction 772 and closed superconducting current path 762 is inductively coupled to a programming interface 732.

Those of skill in the art will appreciate that the embodiments of ZX- and XZ-couplers shown in FIG. 7 are, for the purposes of the present systems, methods and apparatus, intended to serve as exemplary devices only and do not limit the scope of the present systems, methods and apparatus to implementations of XZ- and ZX-couplers exactly as drawn in FIG. 7.

Figure 8:
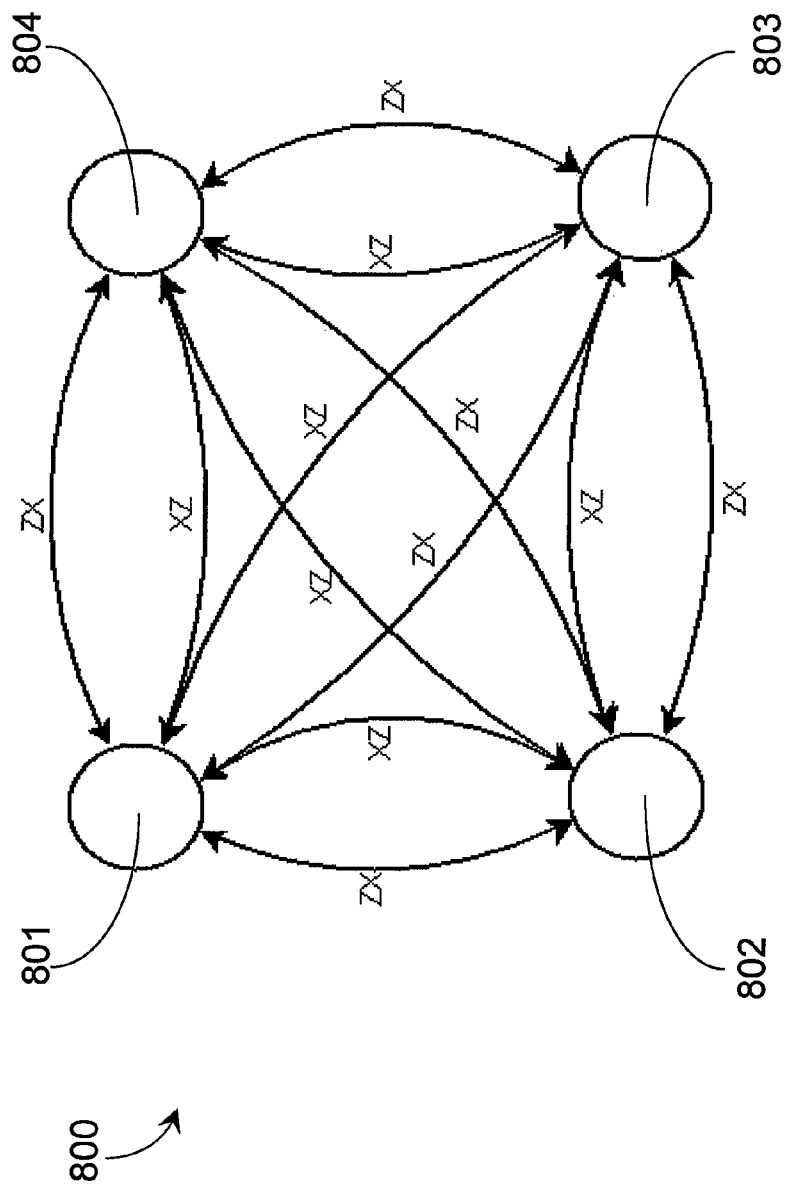
FIG. 8 is a functional diagram of an embodiment of a universal qubit-coupling architecture that incorporates XZ- and ZX-coupling, according to one illustrated embodiment.

In accordance with the present systems, methods and apparatus, the universal Hamiltonian described by equation 3 may be physically realized in a quantum processor with XZ- and ZX-coupling between qubits (in addition to coupling the $\sigma^z$ and $\sigma^x$ terms into each qubit). FIG. 8 is a functional diagram of an embodiment of a universal qubit-coupling architecture 800 that incorporates XZ- and ZX-coupling. Coupling architecture 800 shows four effective qubits 801-804, though those of skill in the relevant art will recognize that a similar coupling scheme may be applied to any number of qubits in a quantum processor. For instance, in an array or lattice of qubits, coupling architecture 800 would provide both XZ- and ZX-coupling between nearest and next-nearest neighboring pairs of effective qubits. In FIG. 8, the couplers are represented by solid lines joining two effective qubits and in each case the type of coupling ("XZ" or "ZX") is indicated next to the solid line. XZ- and ZX-couplers do not commute, that is, $[XZ,ZX] \neq 0$.

As previously stated, those of skill in the art will appreciate that a similar coupling architecture may be applied in a quantum processor involving a different number of qubits. However, it is recognized in U.S. patent application Ser. No. 12/013,192 that the operation of a single qubit device may be adversely affected if it is connected too many couplers. In such instances, it is possible to combine two or more individual qubit devices as one effective qubit such that the desired number of couplers may be applied without adversely affecting the operation of the qubit devices.

Furthermore, those of skill in the art will appreciate that the Hamiltonian described by equation 3 may be physically realized by coupling architectures that differ from coupling architecture 800 shown in FIG. 8. For instance, in some embodiments it may be appropriate to include XZ-coupling between some qubits and ZX-coupling between some qubits, but not necessarily both XZ- and ZX-coupling between every pair of coupled qubits. In some embodiments, it may be preferred to use only one type of coupling between any given pair of qubits, thereby providing a coupling architecture in which XZ-coupling and ZX-coupling are both present but never shared between the same pair of qubits.

A further aspect of the present systems, methods and apparatus is the use of a first set of non-commuting couplers to effectively simulate a second set of different couplers, which thereby confirms the universality of the first set of non-commuting couplers. For instance, a coupling scheme involving only XX- and ZZ-couplers may be used to simulate a coupling scheme involving XZ- and ZX-couplers, and vice versa. Such "coupler simulation" may be accomplished through "mediator qubits" which may be similar in structure to previously described qubits but may be used as intermediate coupling points between two or more effective qubits. Effectively, a mediator qubit may be used as a transition point between two types of couplers. Full details of such mediated qubit-coupling are described in Biamonte et al., a brief overview of which is now provided.

Figure 9:
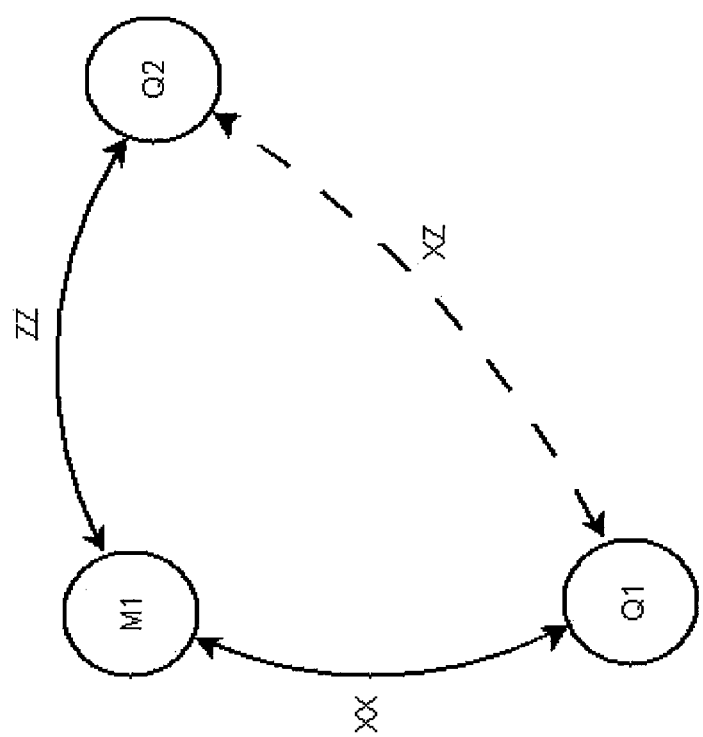
FIG. 9 is a functional diagram of a qubit system comprising two effective qubits and a mediator qubit, according to one illustrated embodiment.

FIG. 9 is a functional diagram of a qubit system 900 comprising two effective qubits, Q1 and Q2, and a mediator qubit M1. Actual couplings are physically implemented between Q1 and M1 and between M1 and Q2 in order to simulate an alternative coupling between Q1 and Q2. The actual couplings that are physically implemented between Q1 and M1 and between M1 and Q2 are represented by solid lines and the actual coupling type is indicated adjacent to each line. The effective coupling (as simulated by the actual mediated coupling) between the two effective qubits Q1 and Q2 is indicated by a dashed line with the effective coupling type indicated adjacent to the line. Thus, FIG. 9 is an embodiment showing how XX- and ZZ-couplers may be combined through a mediator qubit M1 to simulate XZ (and ZX) coupling. The simulated XZ coupling between Q1 and Q2 is accomplished by coupling XX from Q1 to M1 and ZZ from M1 to Q2. As shown in FIG. 9, an XX-coupler may combine with a ZZ-coupler through a mediator qubit M1 to simulate XZ coupling (or, alternatively, ZX coupling) between two effective qubits Q1 and Q2. FIG. 9 is an exemplary embodiment that uses two effective qubits Q1, Q2 and one mediator qubit M1; however, those of skill in the art will appreciate that the same principles may be applied to a system comprising any number of qubit devices.

Figure 10:
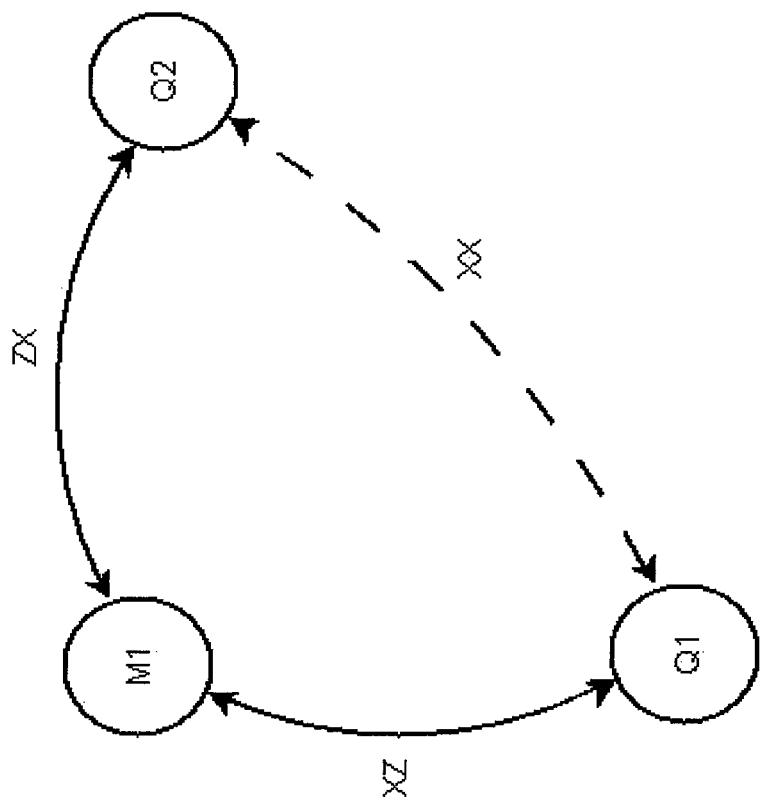
FIG. 10 is a functional diagram of another qubit system comprising two effective qubits and a mediator qubit, according to one illustrated embodiment.

Similarly, FIG. 10 is a functional diagram of a qubit system 1000 comprising two effective qubits Q1, Q2 and a mediator qubit M1. Actual couplings are physically implemented between Q1 and M1 and between M1 and Q2 in order to simulate an alternative coupling between Q1 and Q2. The actual couplings that are physically implemented between Q1 and M1 and between M1 and Q2 are represented by solid lines and the actual coupling type is indicated adjacent to each line. The effective coupling (as simulated by the actual mediated coupling) between the two effective qubits Q1, Q2 is indicated by a dashed line with the effective coupling type indicated adjacent to the line. Thus, FIG. 10 is an embodiment showing how XZ- and ZX-couplers may be combined through a mediator qubit M1 to simulate XX (or similarly ZZ) coupling. The simulated XX coupling between Q1 and Q2 is accomplished by coupling XZ from Q1 to M1 and ZX from M1 to Q2. As shown in FIG. 10, an XZ-coupler may combine with a ZX-coupler through a mediator qubit M1 to simulate XX coupling (or alternatively ZZ coupling) between two effective qubits Q1, Q2. FIG. 10 is an exemplary embodiment that uses two effective qubits Q1, Q2 and one mediator qubit M1; however, those of skill in the art will appreciate that the same principles may be applied to a system comprising any number of qubit devices.

The simulated coupling described in FIG. 9 and FIG. 10 allows multiple types of coupling to be realized by fewer actual coupler types. This can provide greater versatility in a quantum processor where the architecture is best-suited for specific types of couplers. For instance, a superconducting quantum processor that, for whatever reason, is best-suited to implement only ZZ-couplers and XX-couplers may incorporate simulated coupling through mediator qubits to realize the effects of simulated XZ and ZX coupling.

Those of skill in the art will appreciate that, for the purposes of realizing the qubit-coupling architectures taught in the present systems, methods and apparatus, the various embodiments of XX-, ZZ-, XZ-, and ZX-couplers described herein represent non-limiting examples of coupling devices. All of the coupling devices described in the present systems, methods and apparatus may be modified to accommodate the requirements of the specific system in which they are being implemented, or to provide a specific functionality that is advantageous in a particular application.

The present systems, methods and apparatus describe the physical realization of universal adiabatic quantum computation by the implementation of at least two different coupling mechanisms in one processor architecture. Each coupling mechanism provides coupling between a first and a second basis (for example, coupling between X and X, X and Z, or Z and Z), thereby defining a "coupled basis" (for example, XX, XZ, or ZZ). In accordance with the present systems, methods and apparatus, qubit-coupling architectures that each include at least two different coupled bases, where at least two different coupled bases do not commute, are used to realize the Hamiltonians for universal adiabatic quantum computation. For example, the various embodiments described herein teach that universal adiabatic quantum computation may be physically realized by the simultaneous application of off-diagonal couplers in a qubit-coupling architectures. Those of skill in the art will appreciate that this concept may extend to couplers that include the Y-basis, such as XY-, YX-, YY-, ZY-, and YZ-couplers.

This specification and the appended claims describe physical implementations of realizable Hamiltonians for universal adiabatic quantum computers by demonstrating universal qubit-coupling architectures. There is a common element to the embodiments of universal coupling schemes described herein, and that is the implementation of at least two different sets of coupling devices between qubits, where the respective bases coupled by the two different sets of coupling devices do not commute. Those of skill in the art will appreciate that such non-commuting couplers may be realized in a variety of different embodiments and implementations and all such embodiments cannot practically be disclosed in this specification. Thus, only two physical embodiments, the XX-ZZ coupling architecture and the XZ-ZX coupling architecture, are detailed herein with the recognition that anyone of skill in the relevant art will acknowledge the extension to any quantum processor architecture implementing non-commuting couplers. Furthermore, those of skill in the art will appreciate that certain quantum algorithms or hardware constraints may impose minimum requirements on the number of effective qubits in the quantum processor and/or the number of couplers. The present systems, methods and apparatus describe the use of XX and ZZ couplers to simulate XZ and ZX couplers, as well as the use of XZ and ZX couplers to simulate XX and ZZ couplers, thereby proving that a pair of non-commuting couplers in a quantum processor may be used to simulate other coupler schemes.

Throughout this specification, reference is occasionally made to "each qubit" in a quantum processor or a qubit-coupling architecture. Those of skill in the art will appreciate that the term "each" is used in a general sense, where in fact some embodiments may include a qubit or qubits that do not portray the specific feature or characteristic that is generally being described for "each" qubit.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other systems, methods and apparatus of quantum computation, not necessarily the exemplary systems, methods and apparatus for quantum computation generally described above.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to U.S. Provisional Patent Application Ser. No. 60/910,445, filed Apr. 5, 2007, and entitled "Physical Implementations for a Universal Quantum Computer and Related Coupling Devices", U.S. Pat. No. 6,838,694, U.S. Pat. No. 7,335,909, US Patent Publication No. 2006-0225165, U.S. patent application Ser. No. 12/013,192, U.S. Provisional Patent Application Ser. No. 60/986,554 filed Nov. 8, 2007 and entitled "Systems, Devices and Methods for Analog Processing", US Patent Publication No. 2006-0147154, U.S. patent application Ser. No. 12/017,995, U.S. Pat. No. 7,135,701, U.S. patent application Ser. No. 11/317,838, U.S. Provisional Patent Application Ser. No. 60/915,657, filed May 2, 2007 and entitled "Systems, Devices, and Methods for Controllably Coupling Qubits", U.S. Provisional Patent Application Ser. No. 61/024,125, filed Jan. 28, 2008 and entitled "Systems, Devices, And Methods For Controllably Coupling Qubits", U.S. patent application Ser. No. 11/950,276, U.S. patent application Ser. No. 12/098,347 filed Apr. 4, 2008 and entitled "SYSTEMS, METHODS AND APPARATUS FOR ANTI-SYMMETRIC QUBIT-COUPLING", U.S. patent application Ser. No. 12/098,348 filed Apr. 4, 2008 and U.S. patent application Ser. No. 13/539,039 filed Jun. 29, 2012, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. A quantum computing system, comprising:
a quantum processor, comprising:
a first qubit comprising a first qubit loop and a first compound Josephson junction that interrupts the first qubit loop;
a second qubit comprising a second qubit loop and a second compound Josephson junction that interrupts the second qubit loop;
a first coupler communicatively coupled to the first qubit loop and the second compound Josephson junction;
a second coupler communicatively coupled to the first compound Josephson junction and the second qubit loop;
a first programming interface communicatively coupled to the first qubit loop;
a second programming interface communicatively coupled to the first compound Josephson junction;
a third programming interface communicatively coupled to the second qubit loop;
a fourth programming interface communicatively coupled to the second compound Josephson junction;
a fifth programming interface communicatively coupled to the first coupler; and
a sixth programming interface communicatively coupled to the second coupler,
wherein the quantum processor in operation is selectively programmable via the first, the second, the third, the fourth, the fifth, and the sixth programming interfaces to implement a universal Hamiltonian, the quantum computing system further comprising:
a programming system, inductively coupled to each of the first, the second, the third, the fourth, the fifth, and the sixth programming interfaces.

2. The quantum computing system of claim 1 wherein the programming system is on-chip with the quantum processor.

3. The quantum computing system of claim 1 wherein the first and the second qubits are superconducting flux qubits.

4. The quantum computing system of claim 3 wherein:
each of the first and the third programming interfaces inductively coupled to the first and second qubits respectively,
the first and the third programming interfaces operable to couple a flux signal into the first and the second qubit loops respectively, and
each of the second and fourth programming interfaces inductively coupled to the first and the second qubits respectively, the second and the fourth programming interfaces operable to couple a flux signal into the first and the second compound Josephson junctions.

5. The quantum computing system of claim 4 wherein:
the first coupler comprises a first coupling loop interrupted by at least one Josephson junction, the fifth programming interface inductively coupled to the first coupling loop operable to tune the susceptibility of the first coupler, and
the second coupler comprises a second coupling loop interrupted by at least one Josephson junction, the sixth programming interface inductively coupled to the second coupling loop and operable to tune the susceptibility of the second coupler.

6. The quantum computing system of claim 1 wherein:
the first and the third programming interfaces are communicatively coupled to a Z-degree of freedom of the first and the second qubits respectively;
the second and the fourth programming interfaces are communicatively coupled to an X-degree of freedom of the first and the second qubits respectively;
the first coupler operable to provide ZX coupling of the first qubit to the second qubit; and
the second coupler operable to provide XZ coupling of the first qubit to the second qubit.

* * * * *